United States Patent

Kettlewell et al.

Patent Number: 5,487,698
Date of Patent: Jan. 30, 1996

[54] STUNNING APPARATUS

[75] Inventors: Peter J. Kettlewell, Marston Mortaine; Mark E. R. Paice, Hitchen; William C. Whetlor, Kempston; Julian M. Sparrey, Silsoe, all of England

[73] Assignee: British Technology Group Ltd., London, United Kingdom

[21] Appl. No.: 211,679

[22] PCT Filed: Oct. 13, 1992

[86] PCT No.: PCT/GB92/01872

§ 371 Date: Apr. 12, 1994

§ 102(e) Date: Apr. 12, 1994

[87] PCT Pub. No.: WO/9307757

PCT Pub. Date: Apr. 29, 1993

[30] Foreign Application Priority Data

Oct. 18, 1991 [GB] United Kingdom ........... 9122142

[51] Int. Cl.6 .................................................. A22B 3/06
[52] U.S. Cl. ...................................... 452/58; 452/59
[58] Field of Search ..................................... 452/52, 59

[56] References Cited

U.S. PATENT DOCUMENTS

| | | | |
|---|---|---|---|
| 2,621,362 | 12/1952 | Cosden | 452/58 |
| 2,879,539 | 3/1959 | Cervin | 452/58 |
| 3,555,594 | 1/1971 | Groover et al. | 452/58 |
| 3,828,397 | 8/1974 | Harben | 452/54 |
| 4,751,767 | 6/1988 | Walther | 452/59 |
| 5,306,200 | 4/1994 | Ripol et al. | 452/58 |
| 5,433,658 | 7/1995 | Kettlewell et al. | 452/59 |

FOREIGN PATENT DOCUMENTS

| 0060527 | 9/1982 | European Pat. Off. |
| 9108196 | 8/1991 | Germany |

*Primary Examiner*—Willis Little
*Attorney, Agent, or Firm*—Cushman, Darby & Cushman

[57] ABSTRACT

An apparatus for use in stunning fowl prior to slaughter has a mechanism for passing a predetermined electrical current through a series of items of varying electrical resistance, the mechanism including a continuous shackle train (10) having shackles (11) evenly spaced along its length, a water bath (15), electrical circuitry (21) having a connection to the bath (15) and means (12,16,17) for connecting the circuitry to the shackles (11) such that any object bridging a shackle (11) and the water bath (15) completes an individual electrical circuit, the circuitry being adapted (20) to maintain the predetermined current in all the circuits.

13 Claims, 4 Drawing Sheets

STUNNING APPARATUS

BACKGROUND OF THE INVENTION

1. Field of the Invention

The present invention relates to the sequential passage of a known electrical current through a series of items of varying electrical resistance, and in particular to the passage of current through fowl with the purpose of killing or of stunning the fowl.

2. Related Background Art

There are various regulations aimed at minimizing pain or distress of fowl being slaughtered for human consumption. One method of meeting the regulations involves the use of electric shocks for killing the fowl or for stunning the fowl prior to slaughter. Although this specification relates to apparatus which might be used for killing fowl as well as to apparatus for stunning fowl, for convenience only the latter will be referred to hereafter. The conventional method of effecting this uses a moving shackle train from which the fowl are suspended head down so that the heads are passed through a water bath, the train and water bath having electrical connections such that an electrical current passes through the fowl and stuns them. Conventionally the train and water bath have a constant voltage applied across them. However it has been found in practice that the resistance of individual fowl varies considerably. Also the effective resistance can be affected by adjacent fowl coming into contact. As a result the current passing through the fowl varies considerably, and it appears that a significant number of fowl are only partially stunned.

Whilst one method of ensuring proper stunning of all fowl is to apply a voltage high enough to ensure a sufficient current through the most resistive fowl this results in unnecessary expense and also to high currents through less resistive fowl which can, in some circumstances, have deleterious effects.

SUMMARY OF THE INVENTION

According to the present invention an apparatus for passing an electrical current through each of a series of items of varying electrical resistance, includes a continuous shackle train having shackles evenly spaced along its length, a water bath, electrical circuitry having a connection to the bath and means for connecting the circuitry to the shackles, characterised in that any item bridging a shackle and the water bath completes an individual electrical circuit which is adapted to supply a predetermined current to each item and to maintain the predetermined current for a predetermined time, the predetermined current being the same for each item.

The predetermined time may be set by the dimensions of the components and the speed at which the shackles are moved.

In one form of the invention the apparatus has a plurality of rails, each rail having an electrically conducting portion, each shackle having an electrical contact with one of the rails, adjacent shackles contacting different rails, the spacing of the shackles, the dimensions of the water bath, the number of rails, and the circuitry being such that when articles depend from the shackles so as to bridge shackles and the water bath, each rail is involved in no more than one circuit.

The shackles are preferably carried on plastic trolleys hanging from nylon wheels which run on a track.

The electrical contacts may conveniently be sprung carbon brushes.

The electrical circuitry preferably incorporates means for switching on and off an electrical supply to an inductor such that the current passing through each item is dependant on the ratio between the time when a voltage is applied across the inductor to the time when there is zero voltage.

BRIEF DESCRIPTION OF THE DRAWINGS

One embodiment of the present invention, for use in stunning fowl prior to slaughter, will now be described, by way of example only, with reference to the accompanying diagrammatic drawings, of which.

DETAILED DESCRIPTION OF THE PREFERRED EMBODIMENTS

Figure 1:
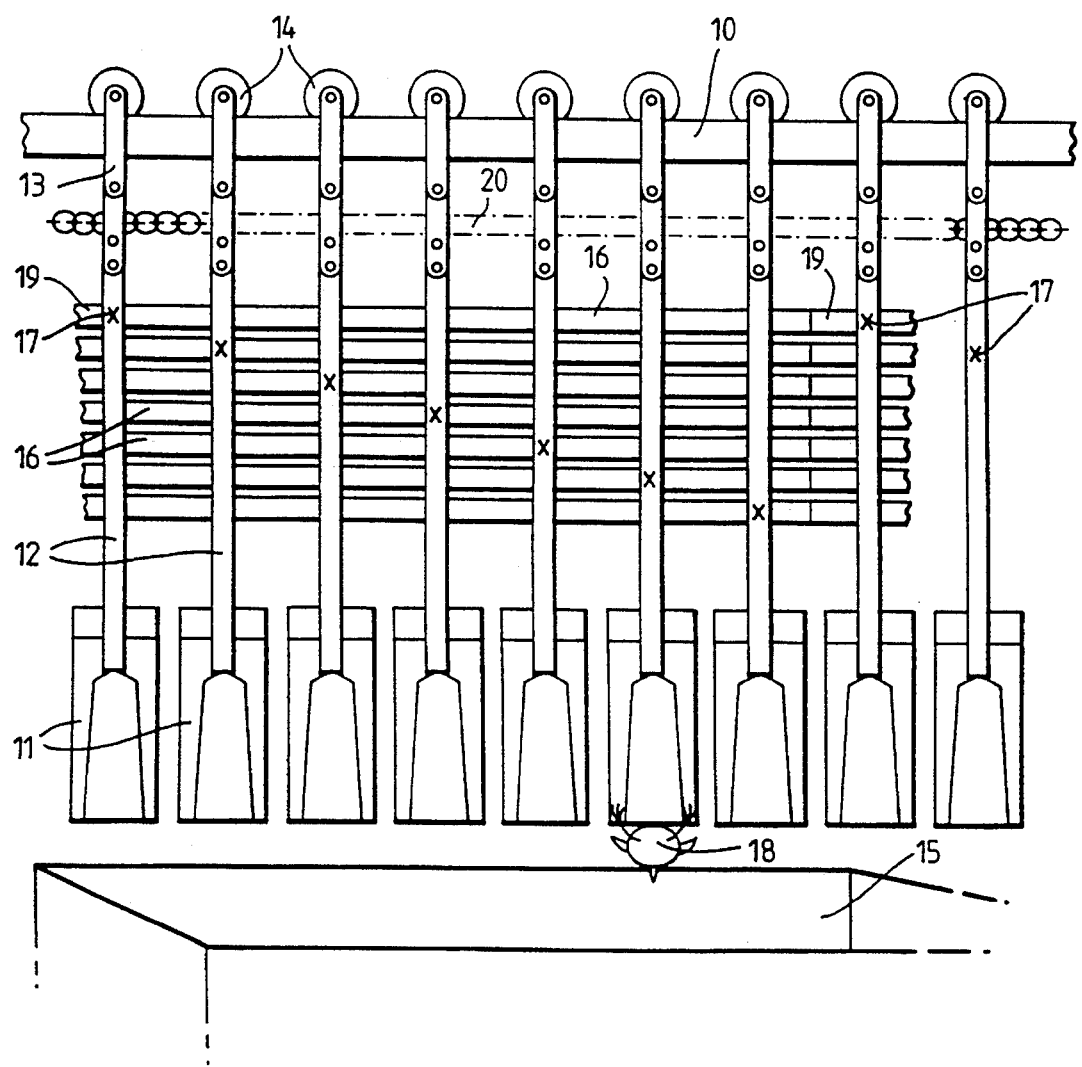
FIG. 1 is an elevation of one embodiment of the invention.

A continuous track, of which part is shown at 10 in FIG. 1, carries a shackle train including plurality of shackles 11 each secured to a rod 12 carried by a trolley 13 mounted on a wheel 14 which rides along the track 10. The shackles 11 are evenly spaced along the length of the track 10 and, with the rods 12, are made from electrically conducting material. The trolleys 13, wheels 14, or preferably both are made of electrically non-conducting material which might be, for example, plastic for the trolleys 13 and nylon for the wheels 14.

A water bath 15 is positioned along and underneath a length of the track 10, and a series of rails, having electrically conducting rail portions 16 and insulated portions 19, is positioned vertically in parallel alignment between the water bath 15 and track 10. The number of rails 16, 19 is equal to the maximum number of shackles 11 which can be positioned vertically above the water bath 15 at any time. The length of the rods 12 is such that top and bottom rails 16, 19 both lie alongside rods 12. Each rod 12 has an electrical connection, as shown at 17, adapted to engage one of the electrically conducting rail portions 16, the arrangement being such that, of shackles 11 vertically above the water bath 15 at any time, no two have bars 12 electrically connected to the same rail portions 16. The electrical connections 17 might be for example, sprung carbon brushes.

The means by which each shackle 11 is suspended from the track 10 is connected to a driving chain 20 which is connected to driving means (not shown).

Figure 2:
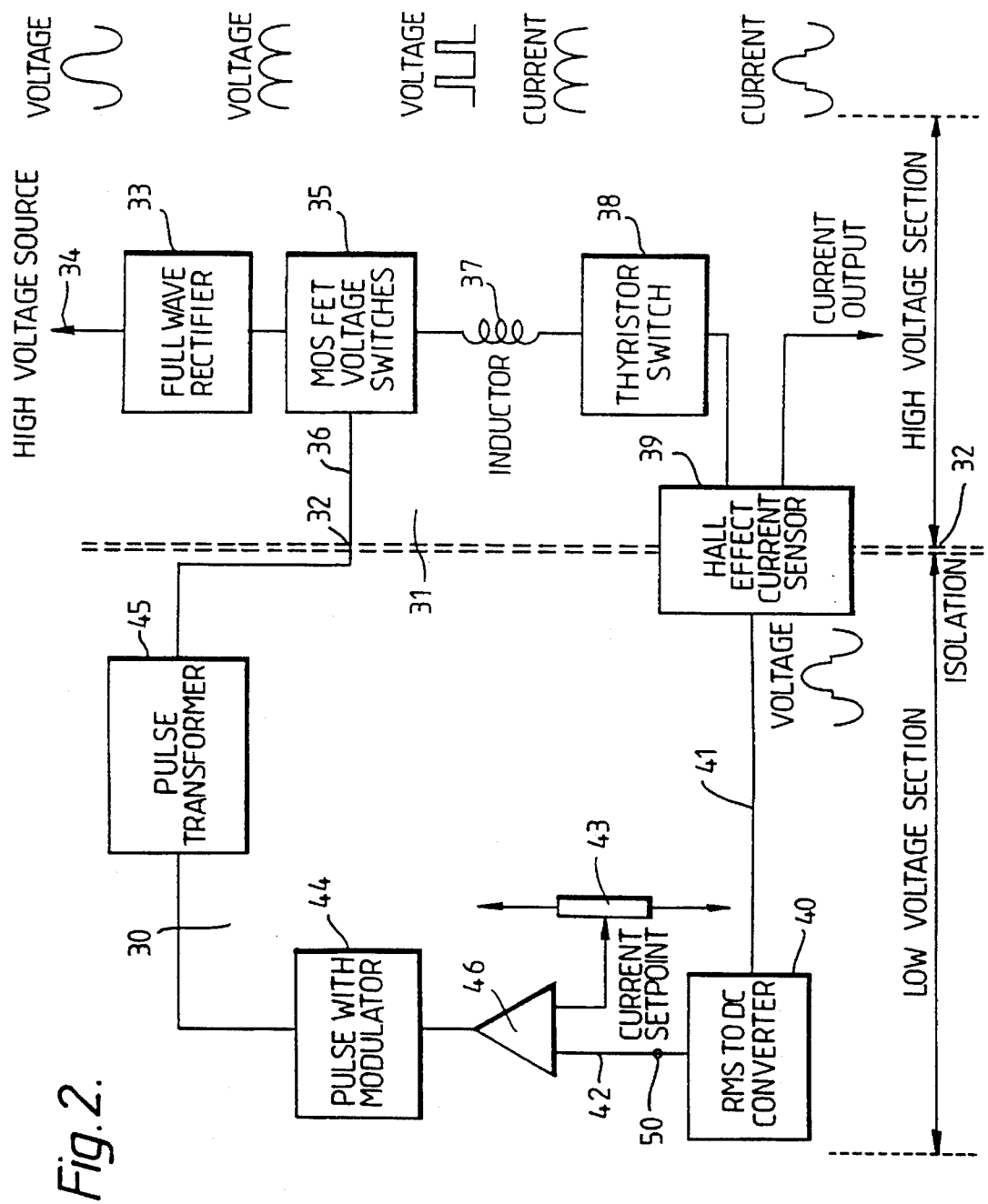
FIG. 2 is a block circuit diagram of electrical circuitry suitable for use with the embodiment of FIG. 1, and FIGS. 3 and 4 are detailed circuit diagrams corresponding to parts of the block circuit of FIG. 2.
Figure 3:
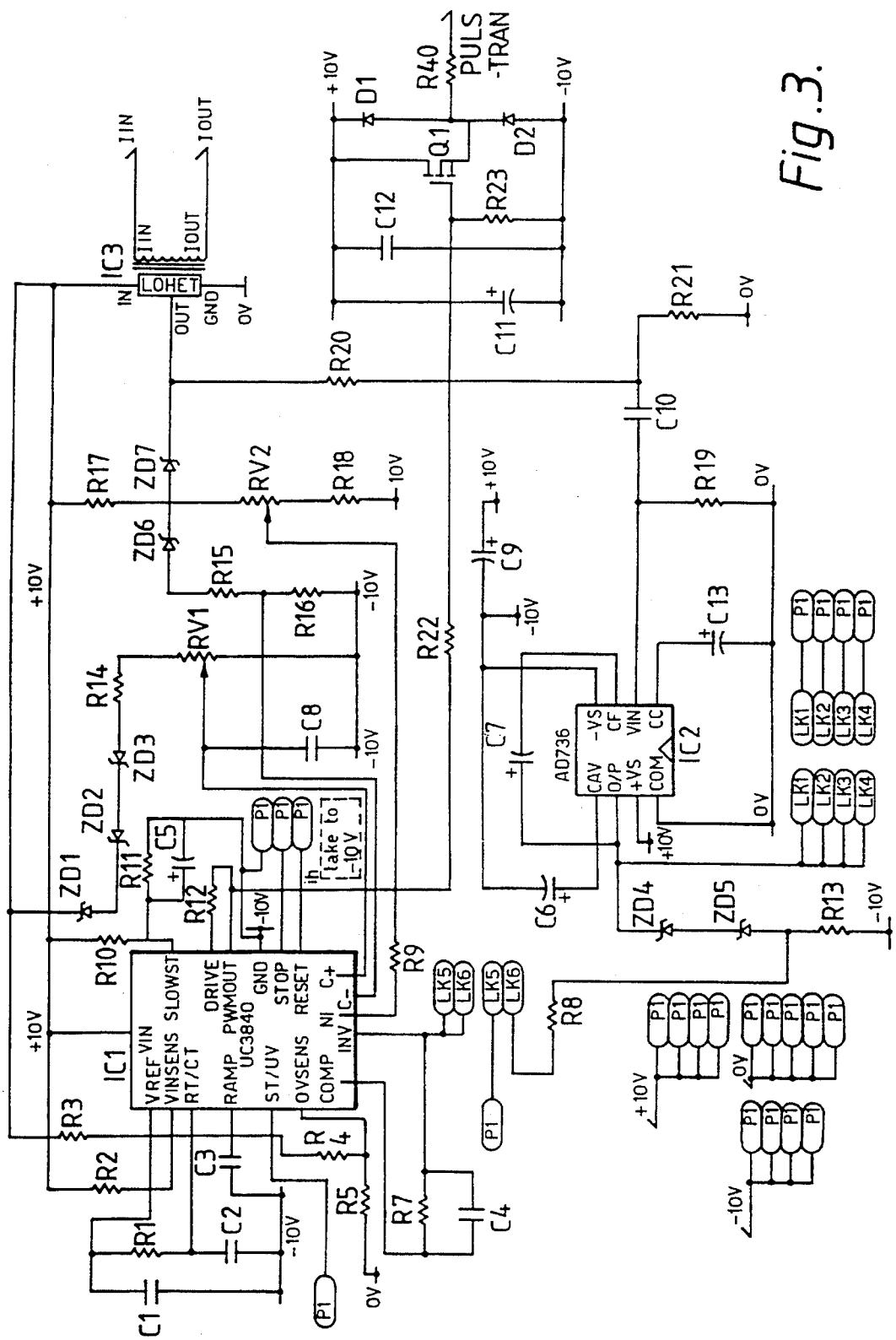
Figure 4:
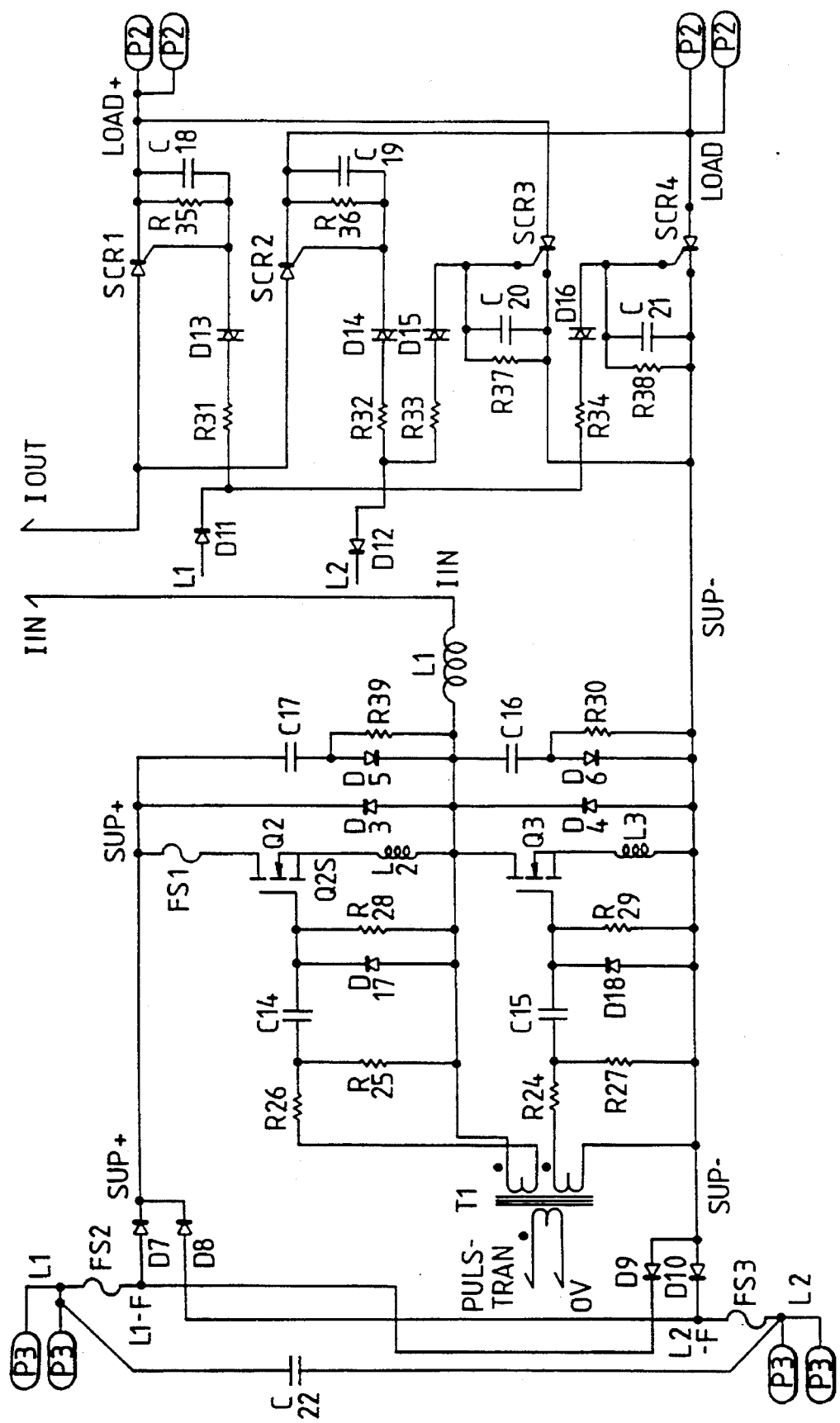

The water bath 15 and each electrically conducting rail portion 16 are connected (connections not shown) to an electrical circuit such as that shown in FIGS. 2, 3 and 4.

As shown in the block diagram of FIG. 2 each circuit is divided into a low voltage section 30 and a high voltage section 31, the sections 30, 31 being connected together at isolation points 32.

The high voltage section 31 contains a full wave rectifier 33 which has a power input 34 from a high voltage power source and which is connected through a Metal Oxide Semiconductor Field Effect Transducer (MOS FET) voltage switch 35, which receives a control input 36 from the low voltage section 30, an inductor 37 and a thyristor switch 38 to a Hall effect current sensor 39. The Hall effect sensor 39 is mounted on a toroidal core which is wound with a sensing coil through which the load current passes.

The low voltage section 30 includes a RMS to DC converter 40 having an input 41 from the Hall effect current sensor 39 and an output 42 to a differential amplifier 46 which compares the output 42 with the output of a current setpoint 43 to provide an error signal to a pulse width modulator 44. The pulse width modulator 44 is connected to a pulse transformer 45 from which the control input 36 leads to the MOS FET voltage switches 35 in the high voltage section 31.

The arrangement by which the power supply control input 36 is fed to the MOS FET voltage switches 35 from the pulse transformer 45, and the arrangement of the Hall effect current sensor 39, in effect ensure that any accessible manual controls, such as the current setpoint 43 can be included in the low voltage section 30 where they are isolated from potentially dangerous high voltages.

A link, as shown at 50, can be included between the RMS to DC converter 40 and the differential amplifier 46 to provide an interface to a digital controller, so allowing for more sophisticated control of the load current.

The low voltage section 30 is shown in more detail in FIG. 3 and the high voltage section 31 is shown in more detail in FIG. 4.

In use, the apparatus operates in general in the same way as conventional stunning apparatus, in that fowl are attached to the shackles 11 as shown at 18 in FIG. 1. The shackle train is operated by the driving mechanism (not shown) driving the chain 20 to bring the head of the fowl 18 on each shackle 11 into a position where its head passes through the water bath 15, causing the completion of an electrical circuit, which results in stunning of the fowl, when the electrical connection 17 associated with the shackle 11 contacts the associated electrically conducting rail portion 16. After passing through the bath 15 each fowl 18 is removed from its shackle 11. Operation of the apparatus is continuous with fowl being attached to and removed from moving shackles 11 by known means.

The electrical circuit operates as follows. The current setpoint 43 is set according to the required current, adjusting the pulse width modulator 44 and hence the pulse width modulation (PWM) signal which passes therefrom, through the pulse transformer 45 and input 36, to the MOS FET voltage switch 35. The switch 35 acts as a voltage switch, the voltage passed therethrough to the inductor 37 being switched between zero and the full voltage supplied from the rectifier 33. The frequency at which the switching occurs, and hence the mark:space ratio (the ratio in which the input of the inductor 37 is switched to the applied voltage rather than to zero) is controlled by the PWM signal. The higher the mark:space ratio the greater the value of the current flowing via the thyristor switch 38 and Hall effect current sensor 39 to the fowl.

It will be realised that many variations of the invention are possible. For example, whilst the fowl illustrated in FIG. 1 are shown to be suspended with their wings along the line of travel it is preferrable that they should be suspended at right angles to this, to reduce the danger of adjacent fowl touching. Also the fowl can advantageously be suspended facing backward with respect to the direction of travel. This prevents them from seeing the approach of the water in the bath 15, a sight which provokes some fowl into attempting avoidance.

As an alternative to the electically conducting rail portions 16 other means might be used. For example trolleys 13 might be electrically conducting and electrically connected to circumferential conductors on the wheels 14, there being electrically conducting rails, arranged similarly to the rail portions 16, on the track 10.

It is important that electrical circuits are not completed until fowls' heads meet the water, so avoiding pre-stun shock from premature current passing through them as a result of water splashed onto the entry zone of the water bath 15. This is effected by providing the electrically conducting rail portions 16 with insulated lead-ins 19.

Alternative circuits to that shown in FIGS. 2 to 4 are possible. For example, current control might be effected by means of a variable resistance in a circuit. However this results in inefficiency because of the inevitable dissipative losses, and also may result in the generation of excessive heat in the system.

It will also be realised that, whilst the circuit described above with reference to FIG. 2 to 4 uses an alternating power source 34, the invention is equally suitable for use with a direct current power source. A circuit using a direct voltage power source might be similar to that described above, but would not require the full wave rectifier 33 or the thyristor switch 38 in the high voltage section 31 or the RMS to DC converter 40 in the low voltage section 30.

What is claimed is:

1. An apparatus for passing an electrical current through each of a series of items of varying electrical resistance, including a continuous shackle train having shackles evenly spaced along its length, a water bath, electrical circuitry having a connection to the bath, means for connecting the circuitry to the shackles, where any item bridging a shackle and the water bath completes an individual electrical circuit and causes a predetermined current to pass through each item, and means for controlling the predetermined current to maintain the predetermined current for a predetermined time, the predetermined current being the same for each item regardless of the electrical resistance of each of the items.

2. An apparatus as claimed in claim 1, wherein the predetermined time is established by the dimensions of the apparatus and by speed of movement of the shackle train.

3. An apparatus for passing an electrical current through each of a series of items of varying electrical resistance, including a continuous shackle train having shackles evenly spaced along its length, a water bath, electrical circuitry having a connection to the bath, and means for connecting the circuitry to the shackles, where any item bridging a shackle and the water bath completes an individual electrical circuit and causes a predetermined current to pass through each item for a predetermined time, the predetermined current being the same for each item regardless of the electrical resistance of each of the items, wherein each individual electric circuit includes at least one voltage switch and an inductor.

4. An apparatus as claimed in claim 3, wherein each voltage switch is a MOS FET switch.

5. An apparatus for passing an electrical current through each of a series of items of varying electrical resistance, including a continuous shackle train having shackles evenly spaced along its length, a water bath, electrical circuitry having a connection to the bath, and means for connecting the circuitry to the shackles, where any item bridging a shackle and the water bath completes an individual electrical circuit and causes a predetermined current to pass through each item for a predetermined time, the predetermined current being the same for each item regardless of the electrical resistance of each of the items, wherein each individual electric circuit includes a low voltage section and a high voltage section.

6. An apparatus as claimed in claim 5, wherein the low voltage section and the high voltage section are connected by a Hall effect current sensor.

7. An apparatus as claimed in claim 6, wherein the Hall effect current sensor is mounted on a toroidal core which is wound with a sensing coil through which a load current passes.

8. An apparatus as claimed in claim 5, wherein the low voltage section includes a pulse transformer from which a control signal is passed to the high voltage section.

9. An apparatus for passing an electrical current through each of a series of items of varying electrical resistance, including a continuous shackle train having shackles evenly spaced along its length, a water bath, electrical circuitry having a connection to the bath, means for connecting the circuitry to the shackles, where any item bridging a shackle and the water bath completes an individual electrical circuit and causes a predetermined current to pass through each item for a predetermined time, the predetermined current being the same for each item regardless of the electrical resistance of each of the items, and a direct current power supply.

10. An apparatus for passing an electrical current through each of a series of items of varying electrical resistance, including a continuous shackle train having shackles evenly spaced along its length, a water bath, electrical circuitry having a connection to the bath, means for connecting the circuitry to the shackles, where any item bridging a shackle and the water bath completes an individual electrical circuit and causes a predetermined current to pass through each item for a predetermined time, the predetermined current being the same for each item regardless of the electrical resistance of each of the items, and an alternating current power supply.

11. An apparatus as claimed in claim 10, wherein the circuit includes a full wave rectifier, a thyristor switch and a RMS to DC converter.

12. An apparatus for passing an electrical current through each of a series of items of varying electrical resistance, including a continuous shackle train having shackles evenly spaced along its length;

a water bath;

electrical circuitry having a connection to the water bath;

means for connecting the circuitry to the shackles, where any item bridging a shackle and the water bath completes an individual electrical circuit and causes a predetermined current to pass through each item for a predetermined time, the predetermined current being the same for each item regardless of the electrical resistance of each of the items; and a plurality of electrically conducting rail portions, wherein each shackle electrically contacts one of the rail portions, wherein adjacent shackles contact different rail portions, and wherein the spacing of the shackles, the dimensions of the water bath, the number of rail portions, and the electrical circuitry are arranged such that each electrically conducting rail portion is involved in no more than one circuit when any item extends from the shackles to the water bath.

13. An apparatus as claimed in claim 12, wherein the electrical contact between each shackle and contacting rail portion is a sprung carbon brush.

\* \* \* \* \*